United States Patent
Vig et al.

(10) Patent No.: US 11,797,521 B1
(45) Date of Patent: Oct. 24, 2023

(54) ASSOCIATING A FUNCTION WITH A TABLE IN A DATABASE SYSTEM

(71) Applicant: Amazon Technologies, Inc., Seattle, WA (US)

(72) Inventors: Akshat Vig, Seattle, WA (US); Somasundaram Perianayagam, Seattle, WA (US); Colin Lazier, Seattle, WA (US); James Christopher Sorenson, Seattle, WA (US); Yosseff Levanoni, Redmond, WA (US); Stefano Stefani, Issaquah, WA (US); Maximiliano Maccanti, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 16/917,698

(22) Filed: Jun. 30, 2020

(51) Int. Cl.
*G06F 16/23* (2019.01)
*G06F 16/22* (2019.01)
*G06F 16/245* (2019.01)

(52) U.S. Cl.
CPC ...... *G06F 16/2379* (2019.01); *G06F 16/2291* (2019.01); *G06F 16/245* (2019.01)

(58) Field of Classification Search
CPC ............... G06F 16/2379; G06F 16/245; G06F 16/2291; G06F 16/9014; G06F 16/9017; G06F 16/24556
See application file for complete search history.

(56) References Cited

U.S. PATENT DOCUMENTS

| | | | |
|---|---|---|---|
| 5,854,890 A * | 12/1998 | Ramachandran .. | G05B 19/4185 719/310 |
| 5,983,228 A * | 11/1999 | Kobayashi ......... | G06F 16/2291 |
| 6,298,342 B1 * | 10/2001 | Graefe ................ | G06F 16/284 707/718 |
| 9,454,571 B2 | 9/2016 | Grosse et al. | |
| 9,996,293 B1 | 6/2018 | Bellizia et al. | |
| 2002/0062449 A1 * | 5/2002 | Perna .................. | G06F 21/629 707/999.009 |
| 2003/0066053 A1 * | 4/2003 | Al-Azzawe ......... | G06F 16/21 709/224 |
| 2012/0005190 A1 * | 1/2012 | Faerber ............ | G06F 16/24542 707/718 |
| 2013/0138626 A1 * | 5/2013 | Delafranier ......... | G06F 16/951 707/713 |
| 2013/0238548 A1 * | 9/2013 | George ................ | G06F 16/283 707/600 |
| 2015/0379077 A1 * | 12/2015 | Grosse .............. | G06F 16/24542 707/718 |
| 2016/0203221 A1 * | 7/2016 | Rao ........................ | G06Q 50/01 707/707 |
| 2018/0267492 A1 * | 9/2018 | Schneider .......... | G05B 19/0426 |
| 2020/0278774 A1 * | 9/2020 | Sanches ................ | G06F 16/178 |
| 2021/0034589 A1 * | 2/2021 | Mathur ................ | G06F 11/1435 |
| 2021/0271965 A1 * | 9/2021 | Malynin ................ | G06N 3/042 |

* cited by examiner

*Primary Examiner* — Hicham Skhoun
(74) *Attorney, Agent, or Firm* — S. Scott Foster; Kowert, Hood, Munyon, Rankin & Goetzel, P.C.

(57) ABSTRACT

A database system may associate functions with a database table. A request to associate a function with a table in a database system may be received. An association between the table and the function may be created. The function may include parameters that are determined from values within the table which are then invoked by a request to perform the function. The associated function may cause the collection of the values prior to performance of the function.

20 Claims, 9 Drawing Sheets

ASSOCIATING A FUNCTION WITH A TABLE IN A DATABASE SYSTEM

BACKGROUND

Database systems manage large amounts of data on behalf of client applications. To support various client application features, different types of data management requests, including requests to create, update, read, or delete data may be supported. Some client applications may rely upon additional analysis of data in order to support some features. For example, values across different items in a table may be aggregated to provide a summation of the values in order to support a client application operation.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement associating a function with a table in a database system. Different types of databases may be optimized for different types of analysis. For some databases, such as Online Transaction Processing (OLTP) or non-relational databases (e.g., NoSQL) databases, read, write, or transaction performance may be prioritized over other analyses. For example, aggregation functions that collect the same data values from a column (or same attribute) in order to perform a calculation or other analysis, may have to be read by scans that read through a large portion of database data (e.g., scan all the records or items in a table), consuming significant resources to complete the aggregation functions. Therefore, techniques that can add or improve the performance of different functions at database systems (e.g., which may not be optimized for their performance), may be highly desirable.

In various embodiments, associating a function with a table in a database system may be implemented to improve the performance of different functions at database systems. For example, associating a function with a table may allow for data gathering or other computationally expensive operations to be performed for the table prior to the receipt of a request (e.g., a query) that invokes execution of the function. Consider the aggregation example mentioned above. The data values used to perform the aggregation function (e.g., sums of values for an attribute) may be computed as the items are added to the database so that when an associated average function is invoked, the inputs of sum of values and count of items can be easily obtained to perform the average function. Additionally, data gathering or other operations of a function associated with a table can be performed at efficient times so as not to interfere or reduce the performance of other operations (e.g., take resources away from performing client requests). Therefore, techniques of associating a function with a table in a database system, as described herein can improve the performance of a database in various ways, both in improving the performance of the function itself when executed in response to a client application request and the performance of the database system overall.

Figure 1:
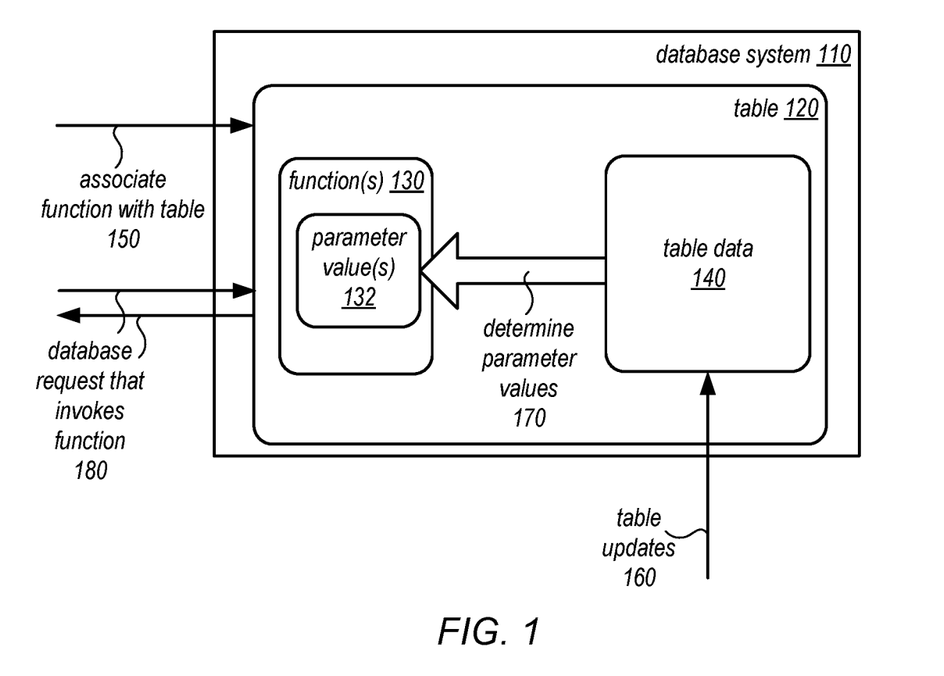
FIG. 1 is a logical block diagram illustrating associating a function with a table in a database system, according to some embodiments.

FIG. 1 is a logical block diagram illustrating associating a function with a table in a database system, according to some embodiments. Database system 110 may be one of various types of database system (e.g., relational, non-relational, etc.), which may store a table 120 on behalf of a client of a database. Table 120 may be a collection of items (e.g., associated together as individual items without reference to a common schema or structured according to a schema that specifies features such as columns (e.g., name and type of data). Table data 140 may be the entries, rows, objects or other items stored for access by client applications (e.g., to perform various access requests, including queries, inserts, updates, modifications, reads or writes, among other access requests).

In order to support various types of analysis or actions with respect to table data 140, a function 130 can be associated, as indicated at 150, with table 120. For example, as discussed below with regard to FIG. 3, a request via an interface can specify or identify function 130 to be associated with the table. In some embodiments, multiple different functions 130 can be associated with table 120. Function(s) 130 can be one (or more) of a set of functions supported by database system 110 that can be associated with a table, such as table 120. In some embodiments, function(s) 130 may be user-defined or otherwise provided to database system 110 (e.g., via code, script, or other instructions that can be executed). In some embodiments, function(s) 130 may be executed in a different location, as discussed below with regard to FIG. 5, and thus may be specified by an identifier or other information used to invoke execution of the function remotely and the parameter value(s) 132 to collect. Associating functions with individual tables, in various embodiments, may allow database system 110 can collect the information to perform the function (e.g., aggregation operations such as min, max, average, summation, std. deviation, count, ranking or other types of user-defined functions, machine learning applications, and so on). As function(s) 130 may be associated with a specified table (e.g., table 120), another table (e.g., not table 120 and not illustrated) which does not have function(s) 130 associated may not be accessed or otherwise analyzed using a function which is not associated with the table (e.g., a table with no associated functions cannot be accessed using a function associated with another table), in some embodiments.

As table updates 160 are made to table data 140, parameter values 132 for performing function 130 may be determined, as indicated at 170. In this way, costly operations to determine the parameter values after a request 180 invoking the function is received can be avoided (e.g., scans). Moreover, specialized hardware, applications, or systems can be leveraged (e.g., externally) to implement further analyses for performing a function than could otherwise be performed within database system 110. When request 180 that invokes the associated function(s) 130 is received, database system 110 can use the determined parameter value(s) 132 to perform function(s) 130, as discussed in detail below with regard to FIGS. 4 and 5.

Please note that previous descriptions of a database system, table, and function are not intended to be limiting, but are merely provided as logical examples.

This specification begins with a general description of a provider network that may implement a database service that may implement associating a function with a table in a database system. Then various examples of a database service are discussed, including different components/modules, or arrangements of components/module, that may be employed as part of implementing the database service, in some embodiments. A number of different methods and techniques to implement associating a function with a table in a database system are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
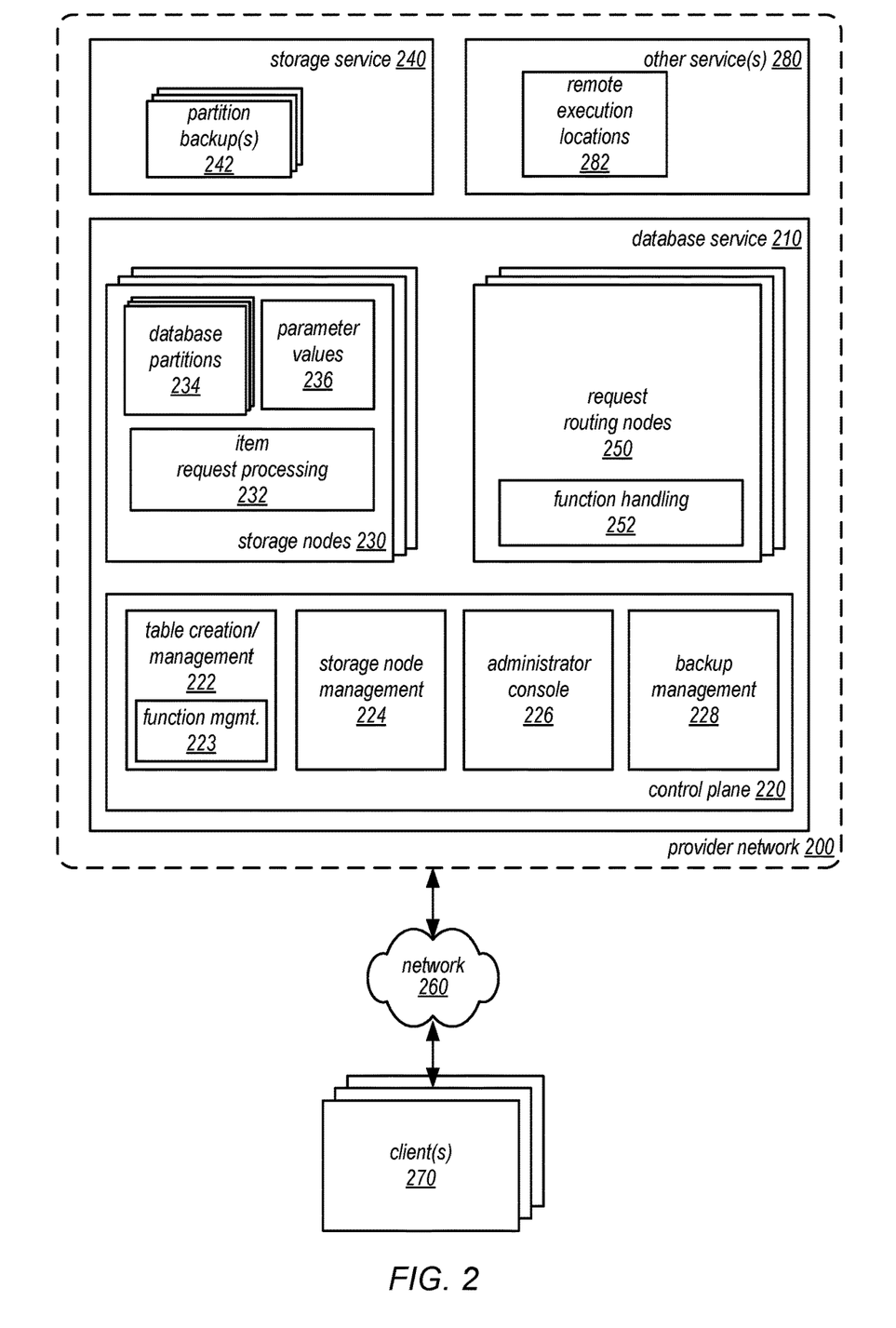
FIG. 2 is a logical block diagram illustrating a provider network offering a database service that may implement associating a function with a table, according to some embodiments.

FIG. 2 is a logical block diagram illustrating a provider network offering a database service that may implement associating a function with a table, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of key value database service 210) may be implemented by a particular node or may be distributed across several nodes. In some embodiments, a given node may implement the functionality of more than one service system component (e.g., more than one data store component).

Database service 210 may be implemented various types of distributed database services, in some embodiments, for storing, accessing, and updating data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL) may be used to specify access requests.

In some embodiments, clients 270 may encompass any type of client configurable to submit network-based requests to provider network 200 via network 260, including requests for database service 210 (e.g., to access item(s) in a table in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse access requests, in various embodiments in order to determine various features of the request, to parse, authenticate, throttle and/or dispatch access requests, among other things, in some embodiments. As discussed in detail below with regard to FIGS. 4-5, request routing nodes 250 may incorporate function handling 252 to perform requests that invoke associated functions.

In some embodiments, database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with processing nodes to initiate the performance of various control plane operations, such as moves of table partitions, splits of partitions, update tables, delete tables, create indexes, etc. . . . In some embodiments, control plane 220 may include a node recovery feature or component that handles failure events for storage nodes 230, and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosed in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Table creation/management 222 may also implement features to associate and manage a function, as indicated at 223, and discussed below with regard to FIG. 3. Backup management 228 may handle the creation of backup requests to make copies as of a version or point-in-time of a database, as backup partitions 242 in storage service 240.

In some embodiments, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230). Parameter values 236 collected for functions associated with tables may also be maintained, updated, and stored at storage nodes 230.

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model).

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments. Thus database partitions 234 may be multi-tenant, in some embodiments when storing items from different database tables. In some embodiments, an index may include table items (e.g., in a B+ tree).

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210, as discussed below with regard to FIG. 3. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: associate a function or invoke a function (as discussed above with regard to FIG. 1 and below with regard to FIGS. 3-8), perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store backups 242. Storage service 240 may implement striping, sharding, or other data distribution techniques so that different portions of a partition backup 242 are stored across multiple locations (e.g., at separate nodes). Other service(s) 280, which may provide various remote execution services may perform functions as remote performance locations 282, in some embodiments.

Figure 3:
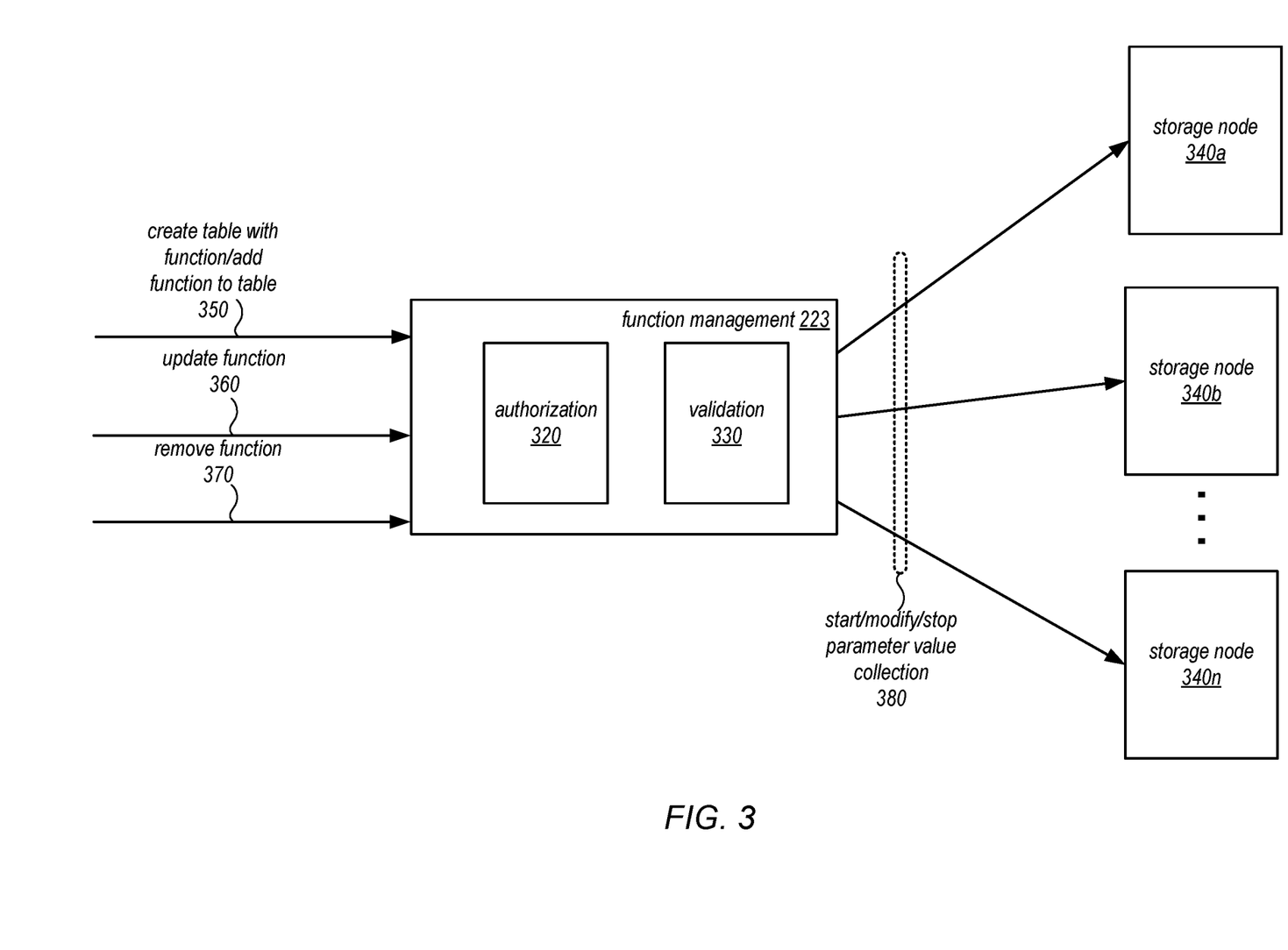
FIG. 3 is a logical block diagram illustrating requests to associate a function with a table, according to some embodiments.

FIG. 3 is a logical block diagram illustrating requests to associate a function with a table, according to some embodiments. Function management 223 may handle requests to create, associate, add or otherwise manage functions with respect to tables. For example, a request to create a table with a function or add a function to an existing table, as indicated at 350 may be received. Function management 232 may implement authorization 320, which as discussed below with regard to FIG. 7, may determine whether the request is authorized for performance (e.g., by an associated user). Function management 223 may implement validation 330, which may determine whether the function to be added is valid, or not, as also discussed below with regard to FIG. 6. Function management 223 may then send requests to start parameter value collection at storage nodes 340a, 340b, and 340c, which may be storage nodes that store partitions of the table associated with the function.

Functions may be further modified after association. For example, as indicated at 360, an update to a function 360 may be received. Authorization 320 and validation 330 may perform respective authorization and validation checks for the update. If allowed, the parameter collection may be modified, as indicated at 380, at storage nodes 340. Similarly, a request to remove a function, as indicated at 370, may be received. The parameter collection may be stopped, as indicated at 380.

Figure 4:
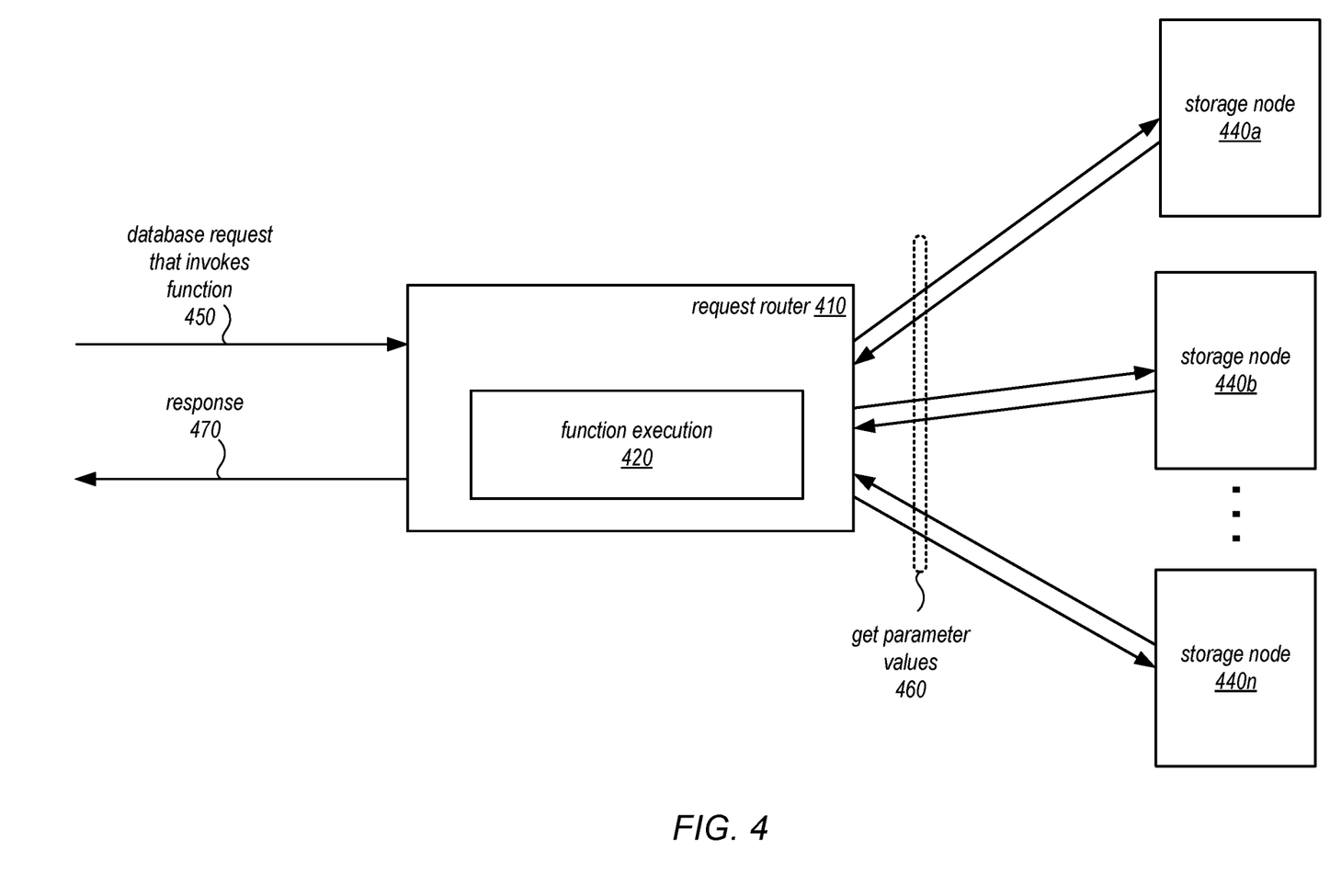
FIG. 4 is a logical block diagram illustrating local performance of a function associated with a table, according to some embodiments.

FIG. 4 is a logical block diagram illustrating local performance of a function associated with a table, according to some embodiments. Request router 410 may receive a database request that invokes a function, as indicated at 450. For example, the request 450 may include a function name, identifier, or other information that cause the function to be performed. Request router 410 may get 460 the parameter values from storage nodes 440a, 440b, 440n, which have been maintained and/or updated. Function execution 420 at request router 410 may perform the execution of the function and then return a response 470, in some embodiments, based on the performance of the function.

Figure 5:
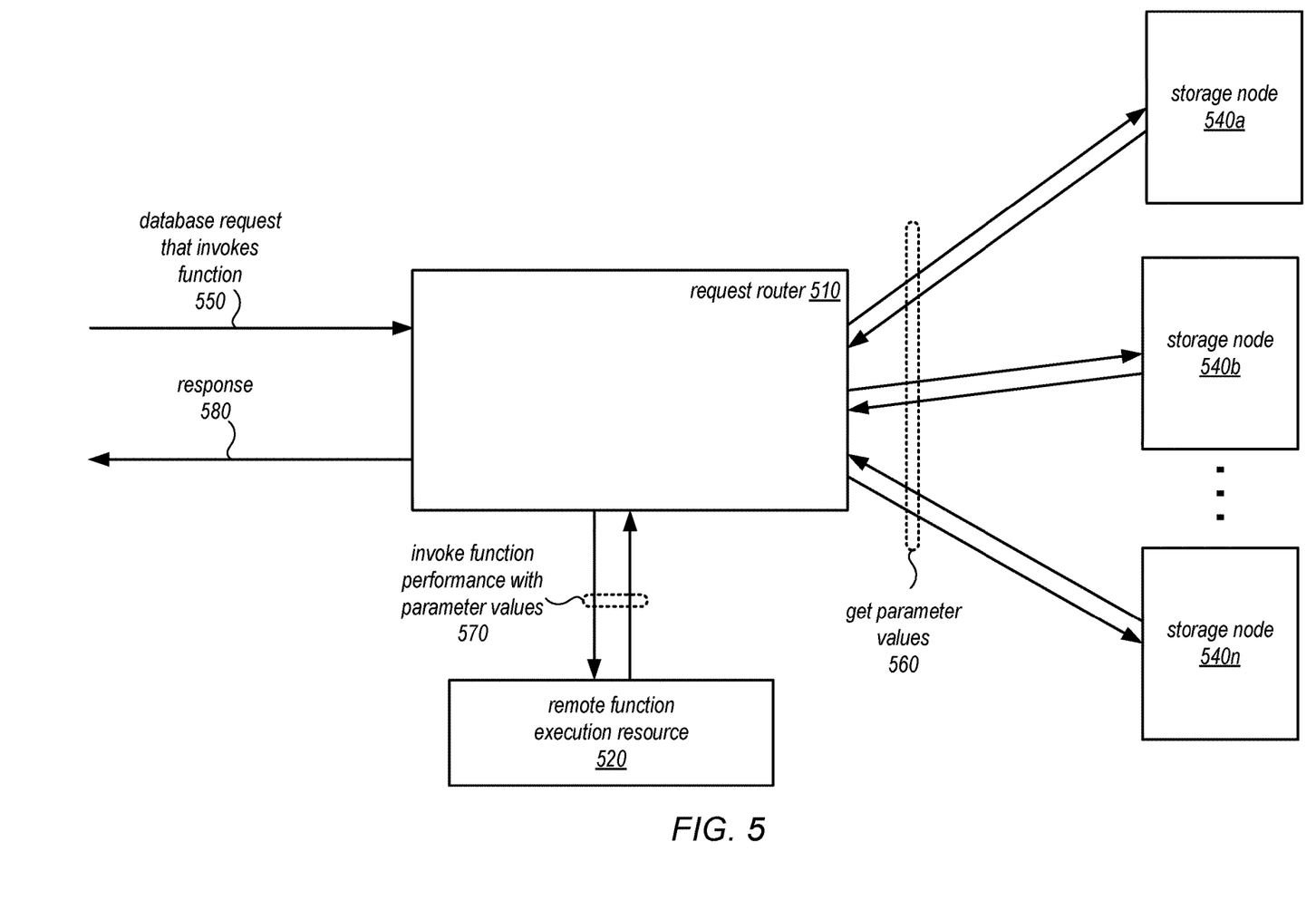
FIG. 5 is a logical block diagram illustrating remote performance of a function associated with a table, according to some embodiments.

FIG. 5 is a logical block diagram illustrating remote performance of a function associated with a table, according to some embodiments. Request router 510 may receive a database request that invokes a function, as indicated at 550. As discussed above with regard to FIG. 4, request 550 may include a function name, identifier, or other information that cause the function to be performed. Request router 510 may get 560 the parameter values from storage nodes 540a, 540b, through 540n, which have been maintained and/or updated. Request router 510 may then send a request to invoke function performance, as indicated at 570, at remote function execution resource 520 and then return a response 580, in some embodiments, based on the performance of the function. For example, request 570 may be formatted according to an interface (e.g. API) that allows for the parameter values obtained at 560 to be sent to remote function execution resource 520 to execute the function. A machine learning model may, for instance, be applied to the parameter value(s) 560, to determine an inference, classification, or other result. This inference, classification, or other machine learning model result may then be used to determine performance of a subsequent action (e.g., response 580), in some embodiments.

Although FIGS. 4 and 5 illustrate a request router handling execution of an associated function (e.g., by gather parameter values and locally executing or remotely invoking execution of the associated function), in some embodiments other database service components may be used. For example, one of the storage nodes could perform similar operations, including requesting or obtaining parameter values from other storage nodes and local or remote execution of the function.

Figure 6:
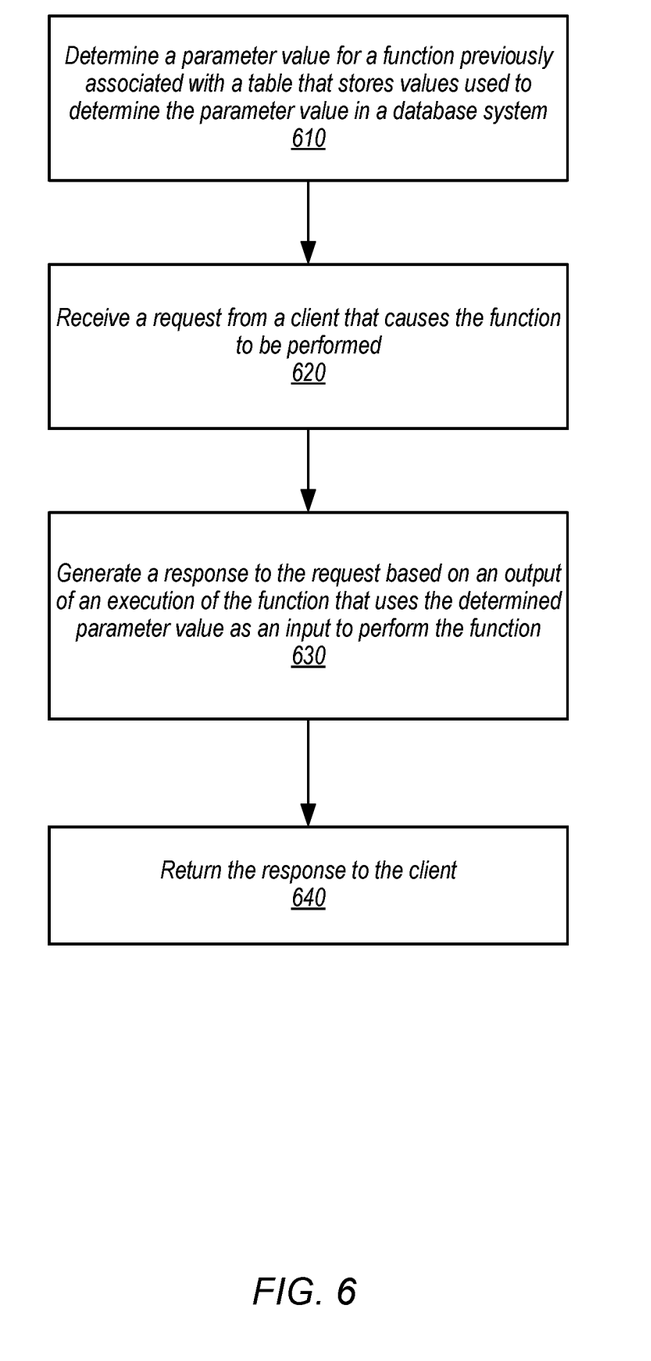
FIG. 6 is a high-level flowchart illustrating various methods and techniques to implement associating a function with a table in a database system, according to some embodiments.

The examples of a database that implements associating a function with a table in a database system as discussed in FIGS. 2-5 above have been given in regard to a database service (e.g., relational database, document database, non-relational database, etc.). However, various other types of database systems can advantageously implement associating a function with a table in a database system, in other embodiments. FIG. 6 is a high-level flowchart illustrating various methods and techniques to implement associating a function with a table in a database system, according to some embodiments. These techniques, as well as the techniques discussed with regard to FIGS. 7-8, may be implemented using components or systems as described above with regard to FIGS. 2-5, as well as other types of databases or storage systems, and thus the following discussion is not intended to be limiting as to the other types of systems that may implement the described techniques.

As indicated at 610, a parameter value for a function previously associated with a table that stores values used to determine the parameter value in a database system may be determined, in some embodiments. For example, different types of functions that perform operations over a group of different table values, including aggregations, validations, or other parameter values derived from multiple values stored across a table may be determined. As discussed above with regard to FIGS. 4 and 5, as well as below with regard to FIG. 7, the parameter value may be determined at a partition of a table (e.g., by counting, summing, or performing other operations on values identified for the function at the partition, which may change as values are added, updated, or deleted at the partition). In various embodiments, the parameter value may be frequently or continuously updated as new updates to the table are made so that the parameter value may change more than once before a request that causes the function to be performed is received.

As indicated at 620, a request from a client that causes the function to be executed may be received, in some embodiments. For example, an identifier, name, or other feature of the request (e.g., a parameter, flag, or API that is formatted specifically for the particular function being invoked) may identify the function. The request may be a query, get, put, insert, or other request to access the table (e.g., read to and/or write from the table), including a transaction to the table, in some embodiments.

As indicated at 630, a response to the request based on an output of an execution of the function that uses the determined parameter value as an input to perform the function may be generated, in some embodiments. For example, as discussed in detail below with regard to FIG. 7 (and above with regard to FIGS. 4 and 5), different types of functions may be performed locally or remotely. Local functions may perform computations within the database system, such as various types of aggregation or other statistical analysis of data values. Some types of functions may utilize other data or user-defined code or instructions (e.g., UDFs), in some embodiments. Remote performance locations may allow for the safe performance of these functions, separate from the database system (e.g., so that malicious code could not be executed, allowing for other types of hardware/software systems that can support other types of operations implemented as part of the function, such as the application of machine learning models, etc.). The response may be a result, including data value(s), such as a data value generated by the function (local or remote), in some embodiments. In some embodiments, the function may cause a write to the table (e.g., by adding a new attribute to an item, or updating a value of an attribute in the table), and the response may be an acknowledgement or indication of the write (or other operation) performed by the function. In some embodiments, the result may be a decision (e.g., valid or invalid) which triggers acceptance or rejection of a client application request or action specified in the request. As indicated at 640, the response may be returned to the client, in some embodiments.

Figure 7:
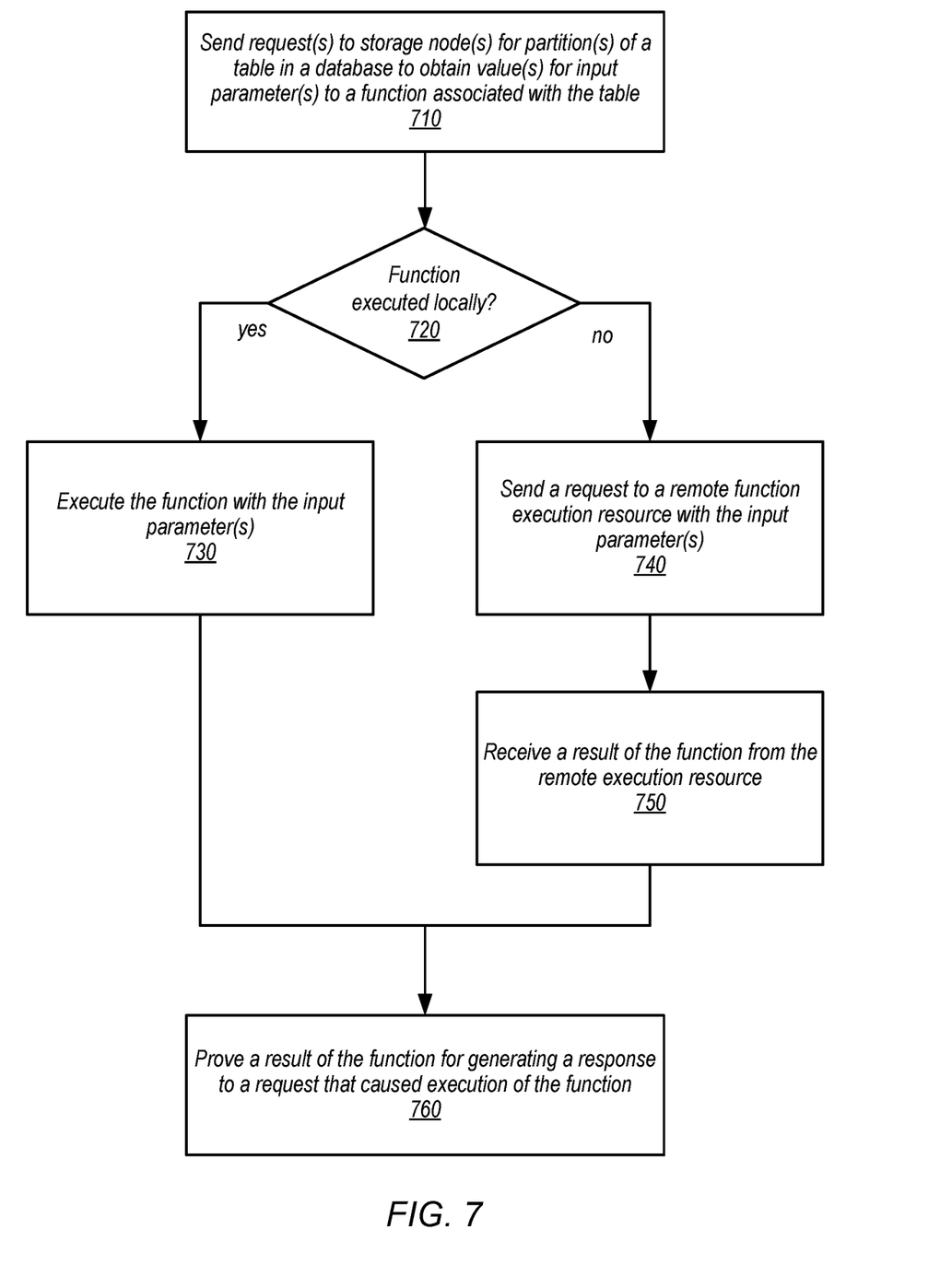
FIG. 7 is a high-level flowchart illustrating various methods and techniques to perform functions associated with a table, according to some embodiments.

Different types of functions may utilize (or depend upon) different resources to perform the function, in some embodiments. The performance location and resources may vary between functions, in some embodiments. FIG. 7 is a high-level flowchart illustrating various methods and techniques to perform functions associated with a table, according to some embodiments.

As indicated at 710, a request(s) may be sent to storage node(s) for partition(s) of a table in a database to obtain value(s) determined for an input parameter to a function associated with a table, in some embodiments. For example, a request router, database query engine, or other request handler for a database system may request the values (e.g., partition value summations, partition value counts, partition value ranking, etc.) used as an input parameter (or multiple input parameters) for the function. In some embodiments, a function identifier may be provide, which may indicate to the storage node which values to return. In other embodiments, a request for specified values may be sent to the storage nodes.

As indicated at 720, a function may be executed locally or remotely, in some embodiments. Local functions may be those functions supported by and or performed by a database system (e.g., a request router, database query engine, or other request handler for the database system). Local functions may be identified according to a function mapping (e.g., between function identifier and performance location), or other information. As indicated at 730, a function that is locally executed may be performed with the input parameter(s). For example, in an aggregation, such as a summation, each partition sum may be an input parameter to a summation operation, which may determine a final summation from the partitions summations, performed by a request router.

Some functions may be remotely executed, in some embodiments. Remotely executed functions may be identified according to a function mapping (e.g., between function identifier and performance location), or other information, in some embodiments. As indicated at 740, a request may be sent to a remote function execution resource with the input parameter(s), in some embodiments. The request may be formatted according to a programmatic interface (e.g., API) to invoke the functions performance, such as by specifying an identifier for the function (which may or may not be the same as an identifier for the function provided in a request to the database system). As indicated at 750, a result of the function may be received from the remote execution resource, in some embodiments.

Figure 8:
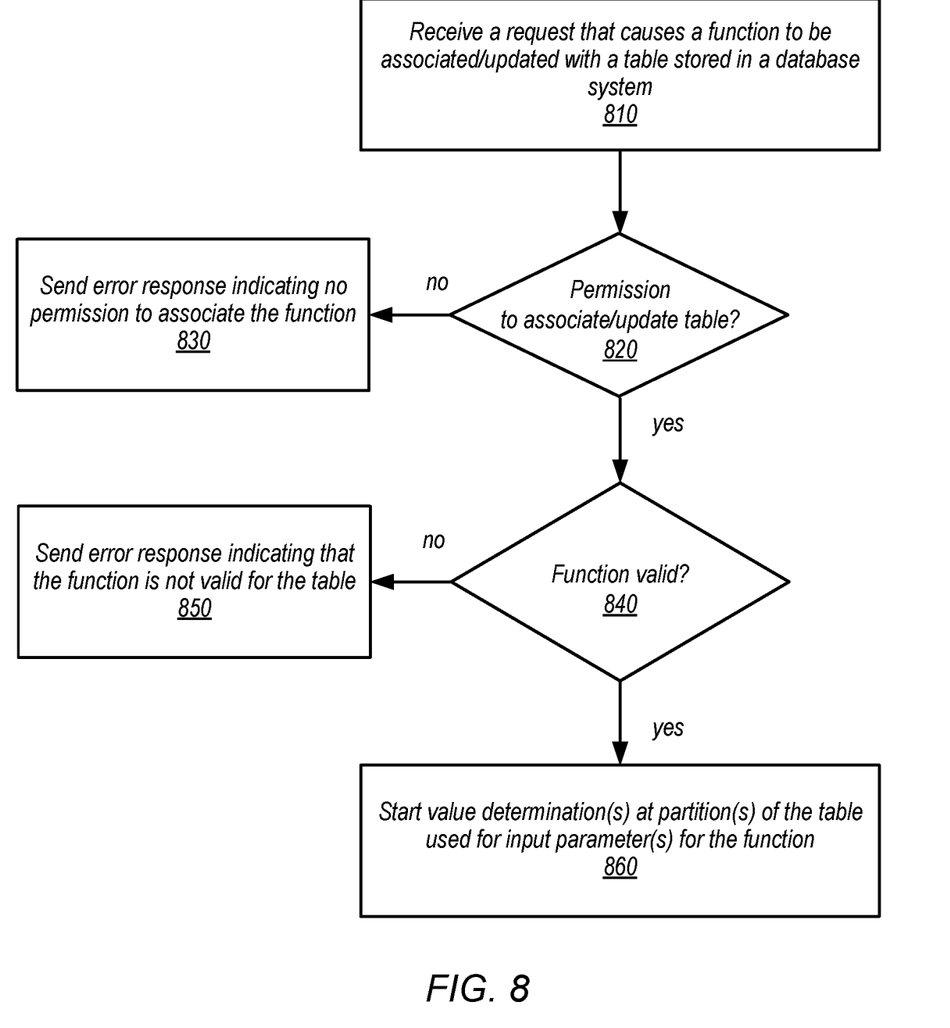
FIG. 8 is a high-level flowchart illustrating various methods and techniques to associate or update a function with a table, according to some embodiments.

As discussed above with regard to FIG. 3, functions can be associated with tables of a database at create, or later. Moreover, functions can, in some embodiments, be updated after being created. FIG. 8 is a high-level flowchart illustrating various methods and techniques to associate or update a function with a table, according to some embodiments. As indicated at 810, a request that causes a function to be associated or updated with a table stored in a database system, in some embodiments. For example, the request may be a request to create a table. In another example, the request may be a request to add a function to a table. The function may be one of different functions implemented by the database system, in some embodiments, specified by the request. The function may be specified by including instructions to perform the function (e.g., by including code or other implementation instructions). In some embodiments, the request may be an update that includes the change to the function (e.g., a change to some aspect of the function, such as a parameter, or to the instructions of the function).

As indicated at 820, a determination may be made in some embodiments as to whether the request has permission to associate/update the able. For example, authorization or identity credentials may be provided with the request which may be checked against a permission list. If permission is not granted, then an error response may be sent indicating that no permission to associate the function has been granted, as indicated at 830, in some embodiments.

As indicated at 840, a validation of the function may be performed, in some embodiments. For example, a function identifier may be checked against an implemented/support function list. In some embodiments, a rules-based validation engine may validate various features and/or instructions of a function, such as input parameters, output parameters, and/or actions taken by the function (e.g., to write to the table). As indicated at 850, for an invalid function, an error response indicating that the function is not valid for the table may be sent, in some embodiments. In some embodiments, the error response may indicate the particular validation failure (e.g., not supported function, invalid action or parameter, etc.).

As indicated at 860, value determination(s) at partition(s) of the table may be started that are used for input parameter(s) for the function, in some embodiments. For example, summation of an attribute value for item(s) at the partitions may begin, which may be updated as changes to the partition are made. In some embodiment, a background scan or other operation may be begun either on the partition data directly (and/or on an archived copy in order to reduce workload at the partition itself).

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
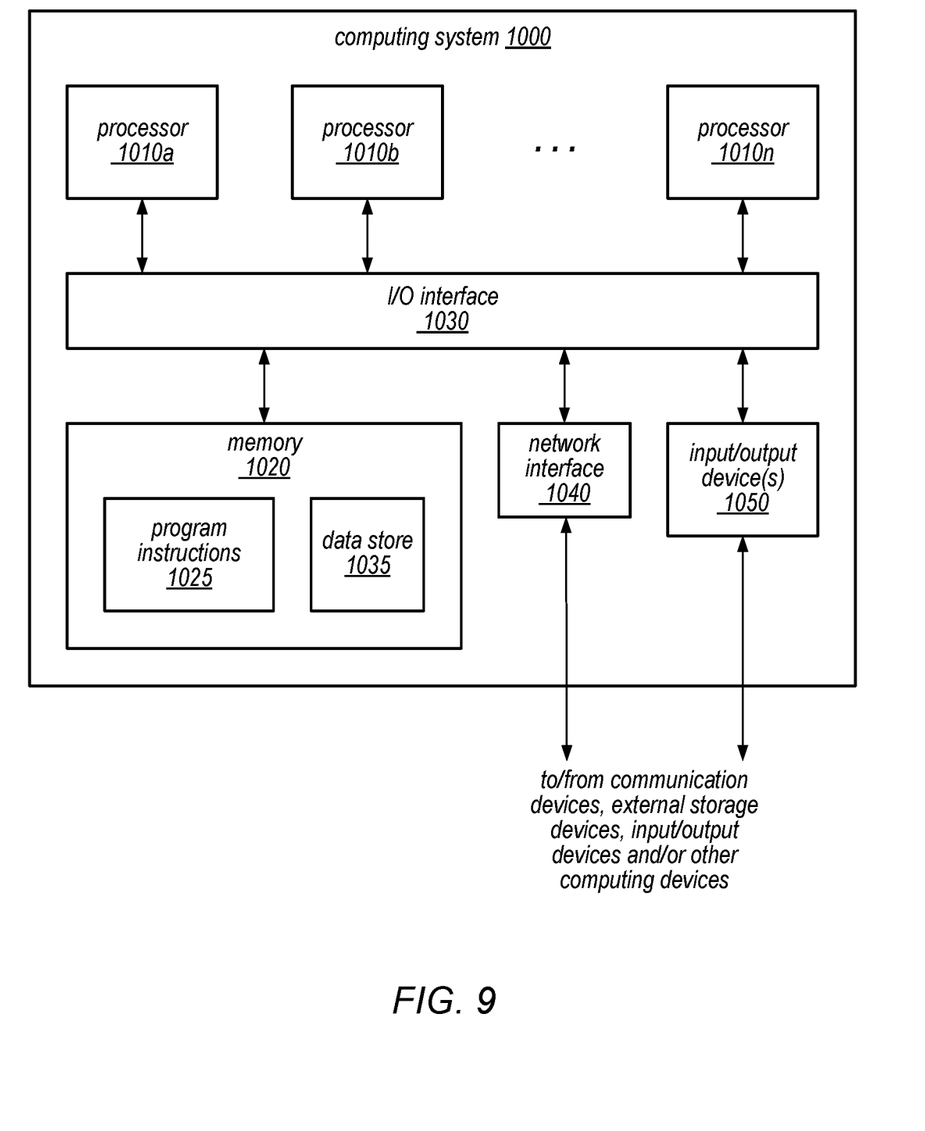
FIG. 9 is a block diagram illustrating an example computing system, according to some embodiments.

Embodiments to implement associating a function with a table in a database system as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement associating a function with a table in a database system, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a database system, the database system configured to:
   responsive to one or more requests to update a table stored in the database system:
   update one or more values of a plurality of values stored as part of the table according to the one or more requests to update the table; and
   update a parameter value different from respective ones of the plurality of values stored as part of the table, the parameter value stored in the database system and based on the plurality of values stored as part of the table, wherein the updating is based at least in part on the updated one or more values, and wherein the parameter value is for a function previously associated with the table storing the plurality of values; and
   receive, from a client, a request accessing the table that causes the function to be executed, and responsive to receiving the request:
   load the updated parameter value from the database system;
   cause execution of the function, the function using the loaded parameter value as an input to perform the function; and
   return, to the client, a response to the request generated based, at least in part, on the table and the execution of the function using the loaded parameter value as input.

2. The system of claim 1, wherein the database system is further configured to:
   receive a request that causes association of the function with the table; and
   responsive to the request that causes association of the function with the table, initiate performance of one or more operations to make a determination of the parameter value at one or more partitions of the table.

3. The system of claim 1, wherein the database system executes the function associated with the request.

4. The system of claim 1, wherein the database system is implemented as part of a database service offered by a provider network, wherein the function is executed by a remote performance resource implemented as part of another service of the provider network that applies a machine learning model using the parameter value to determine a result returned to the database system.

5. A method, comprising:
   updating, by a database system, one or more values of a plurality of values stored as part of a table according to one or more requests to update the table received at the database system;
   updating, by the database system, a parameter value different from respective ones of the plurality of values stored as part of the table, the parameter value stored as part of the database system and based on the plurality of values stored in the table of the database system, wherein the updating is based at least in part on the updated one or more values, and wherein the parameter value is for a function previously associated with the table;
   receiving, at the database system from a client, a request accessing the table that causes the function to be executed, and responsive to receiving the request:
   loading the updated parameter value from the database system;
   generating, by the database system, a response to the request based on an output of an execution of the function using the loaded parameter value as an input to perform the function; and
   returning, by the database system, the response to the client.

6. The method of claim 5, further comprising:
   receiving, at the database system, a request that causes association of the function with the table; and
   responsive to the request that causes association of the function with the table, initiating performance of one or more operations, by the database system, to make a determination of the parameter value at one or more partitions of the table.

7. The method of claim 6, wherein the request that causes association of the function with the table is a request to create the table.

8. The method of claim 6, further comprising:
   evaluating a credential provided with the request that causes association of the function with the table to make a determination, by the database system, that the request that causes association of the function with the table is authorized before starting determination of the parameter value at one or more partitions of the table.

9. The method of claim 6, further comprising:
   evaluating instructions provided to the database system to execute the function to make a determination, by the database system, that the function is valid before starting determination of the parameter value at one or more partitions of the table.

10. The method of claim 5, further comprising:
    executing, by the database system, the function that uses the parameter value as an input to perform the function.

11. The method of claim 5, wherein the function is one of a plurality of different functions implemented by the database system.

12. The method of claim 5, wherein the function is a user defined function (UDF) performed at a remote function execution resource separate from the database system.

13. The method of claim 5, wherein the function performs an aggregation of an attribute of the table across a plurality of partitions of the table.

14. One or more non-transitory, computer-readable storage media, storing program instructions that when executed on or across one or more computing devices cause the one or more computing devices to implement:
    updating, by a database system, one or more values of a plurality of values stored as part of a table according to one or more requests to update the table received at the database system;
    updating, by the database system, a parameter value different from respective ones of the plurality of values stored as part of the table, the parameter value stored as part of the database system and based on the plurality of values, wherein the updating is based at least in part on the updated one or more values, and wherein the parameter value is for a function previously associated with the table;
    receiving, at the database system from a client, a request accessing the table that causes the function to be executed, and responsive to receiving the request:
        loading the updated parameter value from the database system;
        generating, by the database system, a response to the request based on an output of an execution of the function using the loaded value of the parameter as an input to perform the function; and
        returning, by the database system, the response to the client.

15. The one or more non-transitory, computer-readable storage media of claim 14, storing further instructions that when executed by the one or more computing devices cause the one or more computing devices to further implement:
    receiving a request that causes association of the function with the table; and
    responsive to the request that causes association of the function with the table, initiating performance of one or more operations to make a determination of the parameter value at one or more partitions of the table.

16. The one or more non-transitory, computer-readable storage media of claim 15, wherein the request that causes association of the function with the table is a request to add the function to the table, wherein the table exists prior to the request to add the function to the table, and wherein another function was previously associated with the table.

17. The one or more non-transitory, computer-readable storage media of claim 15, storing further instructions that when executed by the one or more computing devices cause the one or more computing devices to further implement:
    evaluating a credential provided with the request that causes association of the function with the table to make a determination that the request that causes association of the function with the table is authorized before starting determination of the parameter value at one or more partitions of the table.

18. The one or more non-transitory, computer-readable storage media of claim 15, storing further instructions that when executed by the one or more computing devices cause the one or more computing devices to further implement:
    evaluating instructions provided to the database system to execute the function to make a determination that the function is valid before starting determination of the parameter value at one or more partitions of the table.

19. The one or more non-transitory, computer-readable storage media of claim 14, storing further instructions that when executed by the one or more computing devices cause the one or more computing devices to further implement:
    performing, by the database system, the function that uses the determined parameter value as an input to perform the function.

20. The one or more non-transitory, computer-readable storage media of claim 14, wherein the database system is implemented as part of a database service offered by a provider network, wherein the function is executed by a remote execution resource implemented as part of another service of the provider network.

* * * * *